United States Patent [19]

Tolsma

[11] Patent Number: 5,010,918

[45] Date of Patent: Apr. 30, 1991

[54] REED VALVE HAVING VARIABLE LENGTH PETAL

[75] Inventor: Jay Tolsma, Grand Ledge, Mich.

[73] Assignee: General Motors Corporation, Detroit, Mich.

[21] Appl. No.: 524,603

[22] Filed: May 17, 1990

[51] Int. Cl.$^5$ ............................................. F16K 15/16
[52] U.S. Cl. ............................ 137/512.15; 123/73 V; 137/856
[58] Field of Search ............... 137/512.1, 512.15, 855, 137/856; 123/65 V, 73 V

[56] References Cited

U.S. PATENT DOCUMENTS 4,643,139 2/1987 Hargreaves .................... 137/855 X
4,748,944 6/1988 Iida ................................. 137/856 X Primary Examiner—Robert G. Nilson
Attorney, Agent, or Firm—Gordon F. Belcher

[57] ABSTRACT

A reed valve for a passage defined by an inner surface in an engine comprises a cage mounted across the passage. The cage has a cage port, an upstream side and a downstream side. The read valve includes a flexible petal having a fixed portion connected to the cage enabling the petal to flex away from the cage in a cantilevered manner. The petal overlies the cage port to allow fluid flow therethrough from the upstream side to the downstream side by flexing away from the cage, and to obstruct fluid back-flow in the reverse direction by seating against the cage. The read valve further comprises an inflatable member adjoining a portion of the petal which flexes away from the cage. The petal is sandwiched between the inflatable member and cage so that inflation of the inflatable member obstructs the flexing of the petal away from the cage to reduce the effective length of the petal.

9 Claims, 2 Drawing Sheets

REED VALVE HAVING VARIABLE LENGTH PETAL

TECHNICAL FIELD

This invention relates to a reed valve for use in an engine and, more particularly, to a reed valve including a petal having a variable effective length.

BACKGROUND

The use of reed valves in engine passages to control the back-flow of fluids is known. A reed valve can be located in an intake passage leading to a cylinder to obstruct back-flow of fluids out of the cylinder into the intake passage.

A reed valve typically includes a cage which spans the cross section of the engine passage. The cage has one or more cage ports allowing fluid flow through the cage. A petal consisting of a flat, flexible member is pivotably connected to the downstream side of the cage adjacent the cage port so that the petal covers the port. Fluid flow having sufficiently high pressure upstream of the cage causes the petal to deflect away from the cage allowing fluid flow therethrough. The petal obstructs fluid back-flow from downstream of the cage toward it since such fluid back-flow will force the petal against the cage obstructing the cage port.

The length of the petal can affect the improvements in engine performance produced by the reed valve and the engine speeds at which the improvements are produced. In typical reed valves, the length of the petal is fixed. This can limit the improvements in engine performance produced by the reed valve and the range of engine speeds at which the improvements are produced.

SUMMARY OF THE INVENTION

The present invention provides a reed valve for a passage defined by an inner surface in an engine. The reed valve comprises a cage mounted across the passage. The cage has a cage port, an upstream side and a downstream side. The reed valve includes a flexible petal having a fixed portion connected to the cage enabling the petal to flex away from the cage in a cantilevered manner. The petal overlies the cage port to allow fluid flow therethrough from the upstream side to the downstream side by flexing away from the cage, and to obstruct fluid back-flow in the reverse direction by seating against the cage. The reed valve further comprises an inflatable member adjoining a portion of the petal which flexes away from the cage. The petal is sandwiched between the inflatable member and cage so that inflation of the inflatable member obstructs the flexing of the petal away from the cage to reduce the effective length of the petal.

Reducing the effective length of the petal by inflating the inflatable member results in a change in the engine speeds at which improvements in engine performance are produced by the reed valve. Varying the effective petal length, by inflating or deflating the inflatable member, can therefore enhance engine performance at different engine speeds. This increases the range of engine speeds over which improvements in engine performance can be produced by the reed valve.

These and other features and advantages of the invention will be more fully understood from the following description of certain specific embodiments of the invention taken together with the accompanying drawings.

BRIEF DRAWING DESCRIPTION

In the drawings.

Corresponding reference characters indicate corresponding parts throughout the several views of the drawings.

DETAILED DESCRIPTION

Figure 1:
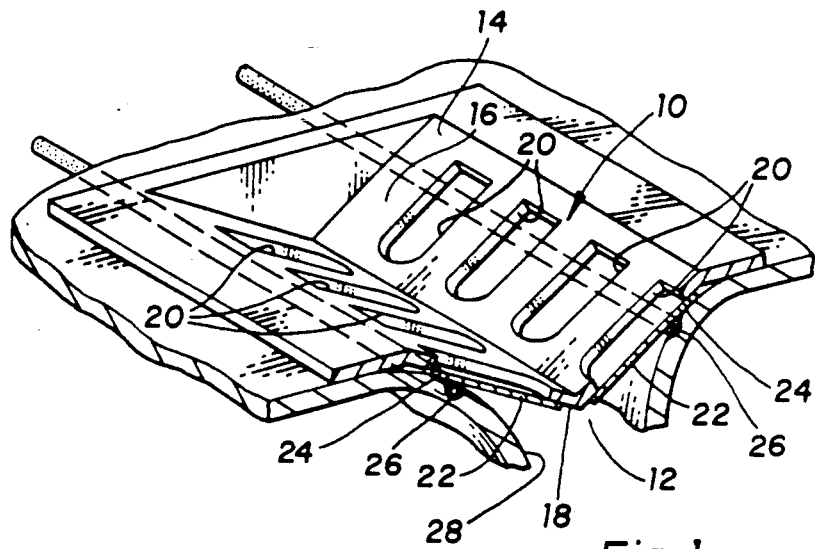
FIG. 1 is a perspective view showing a reed valve of the present invention mounted in a passage.

Referring now to the drawings in detail, and in particular, FIG. 1, numeral 10 generally refers to a reed valve of the present invention mounted in a passage 12.

The reed valve 10 comprises a cage 14 which is mounted across the passage 12. The cage 14 has an upstream side 16 and a downstream side 18. The cage 14 is shown having a plurality of cage ports 20, although a single cage port could be sufficient.

The reed valve 10 further comprises a plurality of flexible petals 22. Each flexible petal 22 has a fixed portion 24 connected to the downstream side 18 enabling the petal to flex away from the cage 14 in a cantilevered manner. Each petal 22 overlies a cage port 20 to allow fluid flow therethrough from the upstream side 16 to the downstream side 18 by flexing away from the cage 14, and to obstruct fluid back-flow through the cage port in the reverse direction by seating against the cage.

A portion of each petal 22 which flexes away from the cage 14 is adjoined by an inflatable member 26 so that the petal is sandwiched between the member and cage. The arrangement is such that inflation of each inflatable member 26 obstructs the flexing of the adjoining petals 22 away from the cage 14 to reduce the effective length of the petals.

More specifically, the cage 14 has a V-shaped cross section projecting downward into the passage 12 in the direction of the fluid flow, as shown in FIG. 1. The portions of the downstream side 18 having the cage ports 20 are inclined toward the inner surface 28 of the passage 12. Sections of the inner surface 28 are also inclined inward toward the cage 14 in the downstream direction. The portions of each downstream side 18 having the cage ports 20 thereby form an acute angle with the adjacent inclined sections of the inner surface 28.

The cage ports 20 each have a similar size and are arranged in two groups. Each group of cage ports 20 is on an opposite side of the apex of the cage 14. The cage ports 20 in each group are equally spaced from the apex of the cage 14 and from the inner surface 28.

Figure 2:
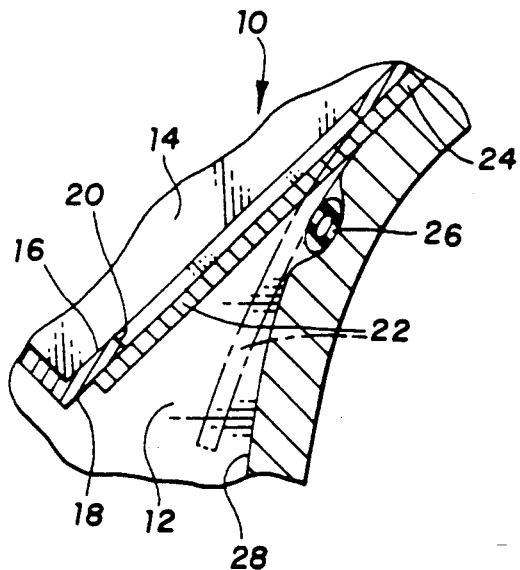
FIG. 2 is a sectional view through the cage and one of the petals of FIG. 1 showing the inflatable member deflated, and the petal in the closed position (in solid lines) and open position (in broken lines)
Figure 3:
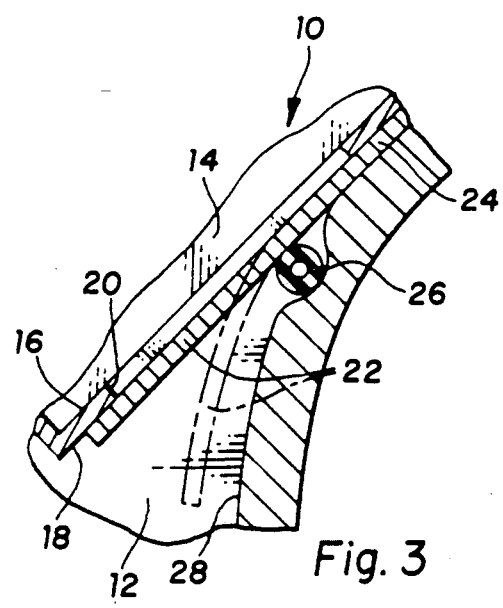
FIG. 3 is a sectional view through the cage and one of the petals of FIG. 1 showing the inflatable member inflated, and the petal in the closed position (in solid lines) and open position (in broken lines)

Each of the fixed portions 24 is sandwiched between the cage 14 and the adjacent inclined section of the inner surface 28. Each fixed portion 24 thereby becomes the fulcrum when the petal 22 flexes, as shown in FIGS. 2 and 3. The fixed portions 24 associated with each group of cage ports 20 are coaxially aligned, as shown in FIG. 1.

The petals 22 adjoining each group of cage ports 20 adjoin an inflatable member 26, as shown in FIG. 1. Each inflatable member 26 is wedged between the portions of the petals 22 which flex away from the cage 14 and the adjacent inclined sections of the inner surface 28. Each inflatable member 26 is parallel to the adjacent fixed portions 24.

As shown in FIGS. 2 and 3, inflation of each inflatable member 26 causes a shift in the respective fulcrums of the adjoining petals 22 toward the inflatable members. This results in a shortening of the effective length of the petals 22. Sufficient inflation of the inflatable members 26 can result in the inflatable members becoming the fulcrums, as shown in FIG. 3. Partial inflation of the inflatable members 26, however, causes the fulcrums to shift to a point between the inflatable members and fixed portions 24 thus allowing adjustment of the effective length of the petals 22.

The parallel orientations of the inflatable members 26 with respect to the fixed portions 24, in combination with the coaxial alignment of the fixed portions, results in each of the petals 22 equally flexing away from the cage 14 irrespective of the inflation of the member. This maintains a balanced fluid flow between the various cage ports 20.

The inflation of the inflatable members 26 can be controlled by connecting them to a pneumatic control system. The control system is preferably linked to a source which varies in proportion to engine speed, such as engine vacuum, so that the inflation of the inflatable members 26, and the effective length of the petals 22, can be varied in proportion to the engine speed. It is possible to link the inflatable members 26 directly to a source of engine vacuum to control their inflation.

Figure 4:
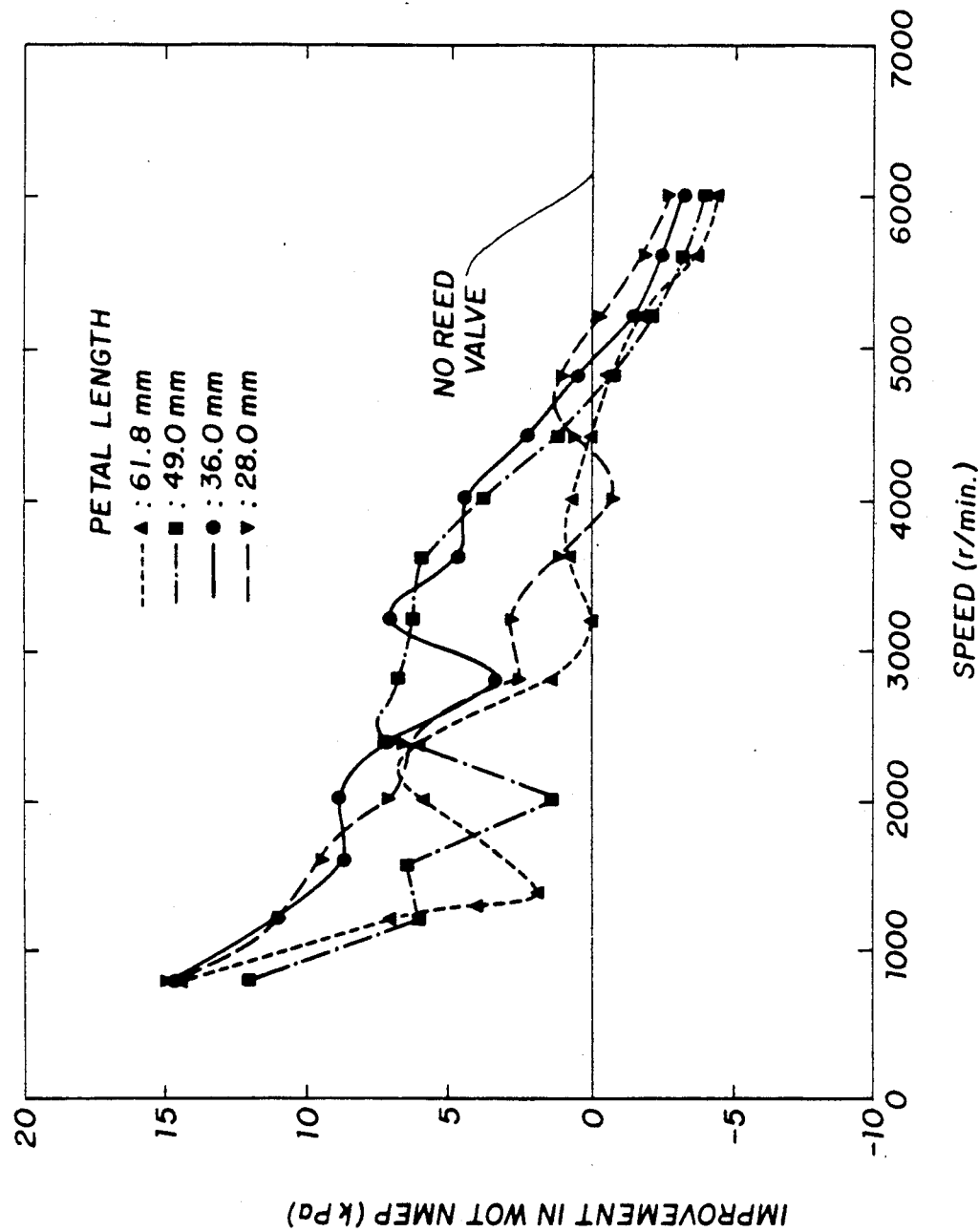
FIG. 4 is a graph showing the improvement in the performance of similar engines having reed valves with different petal lengths, as compared to a similar engine lacking a reed valve.

FIG. 4 shows graphs which were derived from calculated values obtained from an analytical model of an engine having a reed valve in an intake passage leading to a cylinder. The graphs show the improvement in performance of similar engines having reed valves, as compared to a similar engine lacking a reed valve, over a range of engine speeds. The lengths of the petals in each reed valve were different with each curve corresponding to a specific petal length. Net mean effective pressure at wide open throttle was used as the indicia of engine performance.

FIG. 4 shows that the length of the petal 22 can affect the engine performance. FIG. 4 also shows the engine speeds at which engine performance improvements are realized. For example, at the low engine speeds, the petals having lengths of 28.0 and 36.0 mm produced the greatest improvements. At the medium engine speeds, the petals having lengths of 36.0 and 49.0 mm produced the greatest improvements. And at the high engine speeds, the petal having a length of 28.0 mm produced the smallest degradation in engine performance.

The reed valve 10 allows the effective length of the petals 22 to be varied by inflating and deflating the inflatable members 26. This enables the single reed valve 10 to produce improvements in engine performance at a variety of engine speeds since, as shown in FIG. 4, different petal lengths produce improvements at different engine speeds. Engine performance can thereby be improved over a wider range of engine speeds as compared to the range of speeds using a reed valve having a fixed petal length.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A reed valve for a passage defined by an inner surface in an engine comprising:
    a cage mounted across the passage, said cage having a cage port, an upstream side and a downstream side;
    a flexible petal having a fixed portion connected to said cage enabling said petal to flex away from said cage in a cantilevered manner, said petal overlying said cage port to allow fluid flow therethrough from said upstream side to said downstream side by flexing away from said cage, and to obstruct fluid back-flow in the reverse direction by seating against said cage; and
    an inflatable member adjoining a portion of said petal which flexes away from said cage, said petal being sandwiched between said inflatable member and cage so that inflation of said inflatable member obstructs said flexing of said petal away from said cage to reduce the effective length of said petal.

2. A reed valve as set forth in claim 1 wherein the portion of said downstream side having said cage port is inclined toward the inner surface, and said inflatable member is wedged between said petal and the inner surface.

3. A reed valve as set forth in claim 1, and further comprising an additional flexible petal having a fixed portion connected to said cage enabling said additional petal to flex away from said cage in a cantilevered manner, wherein said cage has an additional cage port, said additional petal overlying said additional cage port to allow fluid flow therethrough from said upstream side to said downstream side by flexing away from said cage, and to obstruct fluid back-flow in the reverse direction by seating against said cage, wherein said inflatable member adjoins a portion of said additional petal which flexes away from said cage, said additional petal being sandwiched between said inflatable member and cage so that inflation of said inflatable member obstructs said flexing of said additional petal away from said cage to reduce the effective length of said additional petal.

4. A reed valve as set forth in claim 3 wherein said fixed portions of said petal and additional petal are coaxially aligned and said inflatable member is parallel to said fixed portions.

5. A reed valve assembly for an engine comprising:
    a passage defined by an inner surface in the engine;
    a cage mounted across said passage, said cage having a cage port, an upstream side and a downstream side;
    a flexible petal having a fixed portion connected to said cage enabling said petal to flex away from said cage in a cantilevered manner, said petal overlying said cage port to allow fluid flow therethrough from said upstream side to said downstream side by flexing away from said cage, and to obstruct fluid back-flow in the reverse direction by seating against said cage; and an inflatable member adjoining a portion of said petal which flexes away from said cage, said petal being sandwiched between said inflatable member and cage so that inflation of said inflatable member obstructs said flexing of said petal away from said cage to reduce the effective length of said petal.

6. A reed valve assembly as set forth in claim 5 wherein the portion of said downstream side having said cage port is inclined toward said inner surface, and said inflatable member is wedged between said petal and inner surface.

7. A reed valve assembly as set forth in claim 5 wherein the portion of said inner surface adjacent said cage port is inclined inward in the downstream direction, and said inflatable member is wedged between said petal and inner surface.

8. A reed valve assembly as set forth in claim 5, and further comprising an additional flexible petal having a fixed portion connected to said cage enabling said additional petal to flex away from said cage in a cantilevered manner, wherein said cage has an additional cage port said additional petal overlying said additional cage port to allow fluid flow therethrough from said upstream side to said downstream side by flexing away from said cage, and to obstruct fluid back-flow in the reverse direction by seating against said cage, wherein said inflatable member adjoins a portion of said additional petal which flexes away from said cage, said additional petal being sandwiched between said inflatable member and cage so that inflation of said inflatable member obstructs said flexing of said additional petal away from said cage to reduce the effective length of said additional petal.

9. A reed valve assembly as set forth in claim 8 wherein said fixed portions of said petal and additional petal are coaxially aligned and said inflatable member is parallel to said fixed portions.

* * * * *